United States Patent [19]

Nakanouchi et al.

[11] Patent Number: 4,688,130
[45] Date of Patent: Aug. 18, 1987

[54] PERPENDICULAR MAGNETIC RECORDING MEDIUM AND PRODUCTION PROCESS THEREOF

[75] Inventors: Yukio Nakanouchi, Ageo; Shigehiro Ohnuma, Sendai; Tsuyoshi Masumoto, Sendai, all of Japan

[73] Assignee: Research Development Corporation of Japan, Tokyo, Japan; a part interest

[21] Appl. No.: 767,206

[22] Filed: Aug. 19, 1985

[30] Foreign Application Priority Data

Aug. 20, 1984 [JP] Japan .............................. 59-171505

[51] Int. Cl.$^4$ .............................................. G11B 5/78
[52] U.S. Cl. ..................................... 360/135; 360/134; 204/192.2; 204/192.35; 428/694
[58] Field of Search ............... 360/135, 134; 428/694; 204/192 R, 192 M

[56] References Cited

U.S. PATENT DOCUMENTS

| | | | |
|---|---|---|---|
| 4,348,446 | 9/1982 | Mitsuishi et al. | 428/148 |
| 4,396,643 | 8/1983 | Kuehn et al. | 204/192 SP X |
| 4,521,481 | 6/1985 | Nagao et al. | 360/134 X |
| 4,540,618 | 9/1985 | Suzuki et al. | 428/694 X |
| 4,568,600 | 2/1986 | Ono et al. | 428/694 X |
| 4,578,729 | 3/1986 | Suzuki et al. | 428/694 X |
| 4,584,078 | 4/1986 | Nakanouchi et al. | 204/192 R |

FOREIGN PATENT DOCUMENTS

| | | | |
|---|---|---|---|
| 2026899A | 2/1980 | United Kingdom | 428/694 |
| 2059294A | 4/1981 | United Kingdom | 428/694 |

OTHER PUBLICATIONS

Oya et al., Jpn. J. Appl. Phys., vol. 21 (1982), No. 3, pp. 554-555.
Wehner, Advances in Electronics and Electron Physics, vol. 7 (1955), pp. 274-277.
Guentherschulze et al., Z. Physik, vol. 119 (1942), pp. 685-695.
Kirk-Othmer Encyclopedia of Chemical Technology, 3rd Edition (1983), vol. 19, pp. 36-37.

*Primary Examiner*—John H. Wolff
*Attorney, Agent, or Firm*—Flynn, Thiel, Boutell & Tanis

[57] ABSTRACT

A perpendicular magnetic recording medium is formed of a substrate having $5 \times 10^5 - 5 \times 10^9$ fine projections per mm$^2$ on the surface thereof, said projections having heights in the range of 0.01-10 μm and diameters in the range of 0.01-1 μm, and a ferromagnetic material deposited uniformly in a columnar form on the projections. The recording medium is produced by providing in advance fine projections, the heights and diameters of which are 0.01-10 μm and 0.01-1 μm respectively, on the surface of a substrate to a density of $5 \times 10^5 - 5 \times 10^9$ projections per mm$^2$, and then causing a ferromagnetic material to deposit on the substrate from a vapor phase in such a way that the deposited material is preferentially allowed to adhere onto the projections and then to grow the ferromagnetic material in a direction perpendicular to the plane of the substrate. The present invention has expanded the ranges of usable substrate-forming materials and recording materials, i.e., ferromagnetic materials, and has also simplified the production process.

7 Claims, 4 Drawing Figures

SUBSTRATE SIDE

SUBSTRATE SIDE

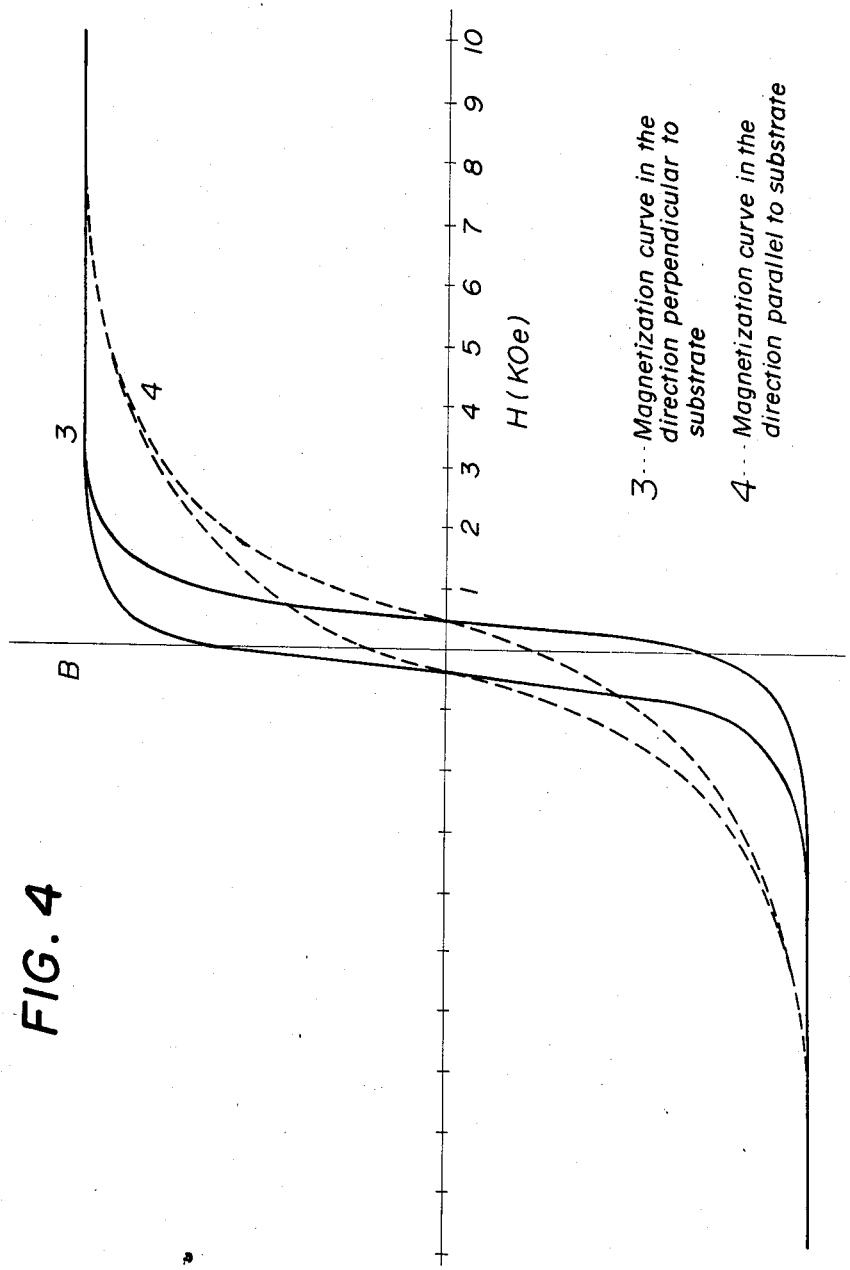

PERPENDICULAR MAGNETIC RECORDING MEDIUM AND PRODUCTION PROCESS THEREOF

BACKGROUND OF THE INVENTION

This invention relates to a perpendicular magnetic recording medium useful as a high-density magnetic recording medium.

The perpendicular magnetic recording method is excellent as a high-density recording method. Many developments have heretofore been made and are currently under way by a variety of researchers on magnetic heads and magnetic recording media, both of which are important to practice the above method.

Those developed as perpendicular magnetic recording media to date may be divided roughly into the following two groups, depending on their production processes:

(1) Those obtained, each, by dispersing ferromagnetic particles in a resin or the like and subjecting the resultant dispersion to a magnetic field upon its coating and drying so as to orient the ferromagnetic particles in the magnetic field; and (2) Those obtained, each, by forming a sputtered or vaccuum-deposited film with axes of easy magnetization oriented and grown in a direction perpendicular to the surface of the film.

According to the process (1), a coating formulation containing ferromagnetic particles dispersed at random in a binder such as resin is solidified while causing the ferromagnetic particles to orient in a magnetic field, thereby obtaining a recording medium such as magnetic tape or magnetic disk. Various problems are however encountered in causing such ferromagnetic particles to orient in the direction parallel to the substrate plane. Namely, the process, (1) is accompanied by such drawbacks that the surface of each resultant coating film tends to become unstable and hence rough due to magnetic poles that appear on the surface, and the orientation of the magnetic particles is reduced because when the external magnetic field is removed after the magnetic particles have been oriented once, a magnetic field is developed in the direction opposite to the orienting magnetic field due to magnetic poles remaining in both sides of the coating film, particles positioned at angles relative to the thus-developed magnetic field are subjected to torques and hence tend to orient in the direction parallel to the substrate plane.

On the other hand, the process (2) makes use of an alloy composition, which is easy to orient along the C-axis, upon forming a coating film by sputtering or evaporation method. At the same time, the temperature of the substrate is raised to obtain the coating film having an easy magnetization axis perpendicular to the substrate plane. There are however inherent limitations imposed on the alloy composition and film-forming conditions. The process (2) cannot always make the axis of easy magnetization of a ferromagnetic material orient in the perpendicular direction. In addition, the requirement for the raised substrate temperature has resulted in a shortcoming that a polymer material having a low softening point cannot be used as a material for the substrate. Besides, in many instances, resultant coating films have columnar structures extending in the directions perpendicular to the planes of the coating films and thus have poor flexibility.

SUMMARY OF THE INVENTION

An object of this invention is to solve the abovedescribed drawbacks of the prior art techniques.

In one aspect of this invention, there is provided a perpendicular magnetic recording medium comprising:

a substrate having $5 \times 10^5 - 5 \times 10^9$ fine projections per mm$^2$ on the surface thereof, said projections having heights in the range of 0.01–10 $\mu$m and diameters in the range of 0.01–1 $\mu$m; and a ferromagnetic material deposited uniformly onto the projections in a columnar form.

In another aspect of this invention, there is also provided a process for producing a perpendicular magnetic recording medium, which comprises:

providing in advance fine projections, the heights and diameters of which are 0.01–10 $\mu$m and 0.01–1 $\mu$m respectively, on the surface of a substrate to a density of $5 \times 10^5 - 5 \times 10^9$ projections per mm$^2$;

causing a ferromagnetic material to deposit on the substrate from a vapor phase in such a way that the deposited material is preferentially allowed to adhere to the projections and then to grow the ferromagnetic material in a direction perpendicular to the substrate plane. The present invention has solved the drawbacks the above-described prior art techniques, has expanded the ranges of usable substrate-forming materials and recording materials, i.e., ferromagnetic materials, and has also simplified the production process.

Fine ferromagnetic particles, which have been formed in accordance with the process of this invention and extend thickly in directions perpendicular to the substrate plane, have their axes of easy magnetization aligned in directions perpendicular to the substrate plane and also have a large coercive force owing to their fine particulate structures. Accordingly, the product of the process is suitable as a perpendicular magnetic recording medium.

The above and other objects, features and advantages of this invention will become apparent from the following description and the appended claims, taken in conjunction with the accompanying drawings.

BRIEF DESCRIPTION OF THE DRAWINGS

In the accompanying drawings:

FIG. 4 is a B-H hysteresis loop of the magnetic recording medium depicted in FIG. 3.

DETAILED DESCRIPTION OF THE PREFERRED EMBODIMENTS

Figure 1:
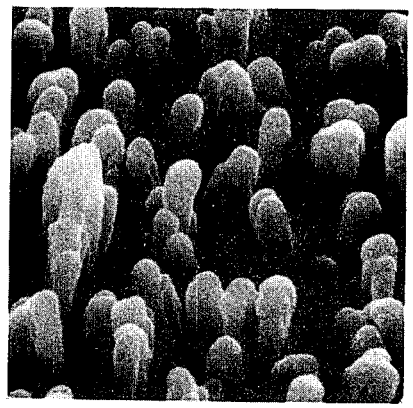
FIG. 1 is a scanning electron micrograph showing the morphology of particles on the surface of a perpendicular magnetic recording medium obtained in Example 1 of this invention.

It is indispensable to meet the following requirements in order to provide magnetic recording media which are equipped with the above-mentioned advantages of this invention.

First of all, the ferromagnetic columnar particles isolated from each other deposited on a substrate must have a suitable aspect ratio, because their magnetic shape anisotropy can be developed when they have appropriate length/height ratios.

Secondly, more and more magnetic single domains are formed and the coercive force thus increases, as ferromagnetic particles become finer. Thus, the ferromagnetic columnar particles deposited on the substrate must have particle size and shape capable of producing this characteristic or smaller.

Thirdly, the size, shape and distribution density of the fine projections present on the surface of the substrate must fall respectively within proper ranges.

If the particle distribution density should be low, it will be difficult to obtain perpendicular magnetic recording media of uniform quality, and the squareness ratio will also be aggravated.

For these reasons, the density, shape and size of fine projections are critical when providing them at a high density on the surface of a substrate in advance. Namely, no shadowing effects will be expected if the density of fine projections should be too low or the sizes of fine projections should be excessively small. If the density of fine projections should be too high on the other hand, adjacent particles will join together with ease and will hence be integrated as a whole into a film. Even if the density is appropriate, provision of excessively tall projections does not bring about any extra advantages and moreover, there is a danger that such excessively tall projections may fall down depending on the material of the substrate. Although the appropriate height, size and density of projections to be formed on the surface of a substrate may vary depending on each ferromagnetic material to be vacuum-deposited on the substrate and conditions to be employed upon vacuum deposition, the present inventors' experiments have proven that their suitable height, diameter and density range 0.01-10 $\mu$m, 0.01-1 $\mu$m and $5\times10^5$-$5\times10^9$ projections/mm$^2$, respectively.

Although chemical etching or chemical deposition may be used as process for providing fine projections on the surface of a substrate, gas plasma etching is particularly advantageous since it provides clean surfaces and permits easy control on the density and size of projections.

Turning next to a process for causing a ferromagnetic material to deposit, the shadowing effects for particles of a deposited material may be expected whether parallel beam or scattered beam is used so long as such appropriate fine projections as mentioned above are provided. In the case of parallel beam, the deposited material however adhere only to one side of projections and grow there when the associated substrate is kept fixed. Thus, uniformity in magnetic property is lost in the direction parallel to the substrate plane and the material is deposited in a smaller amount per unit area. It is hence necessary to rotate the substrate or the beam in order to form axially-symmetrical columnar particles. However, this does not raise any substantial problem for the attainment of objects of this invention. In the case of scattered beam on the other hand, particles come from all directions and adhere on projections. Scattered beam is thus free of the above-mentioned problem of parallel beam. In the practice of the process of this invention, any one of gas plasma sputtering, ionized cluster beam deposition, vacuum evaporation, ion beam sputtering and ion plating may be applied.

Turning now to the material of a substrate, the present invention has a merit that a variety of organic materials may be used because no higher substrate temperatures are particularly required during deposition of a ferromagnetic material. These organic materials are also advantageous in forming such good fine projections as those satisfying the above-described requirements, by gas plasma etching. According to experiments conducted by the present inventors, substrate materials useful in the practice of the present invention include organic materials such as cellulose, polyesters, polyfluorinated ethylene, polyethylene, polystyrene, polyvinyl chloride, polyimides, polyamides, epoxy resins and polyvinyl alcohol. When deposition is effected on a substrate provided with fine projections having such shape, size and density as mentioned above, most ferromagnetic materials may be employed as materials to be deposited. The present inventors' experiments have found that perpendicular magnetic recording media having high coercive forces can still be obtained even with ferromagnetic materials having amorphous structures. For example, $Fe_{80}$-$B_{20}$ alloy which will be referred to in Examples may be obtained as an amorphous alloy in accordance with the liquid quenching method or sputtering method. When formed as a fine amorphous ribbon or film by either one of the above method, its magnetic coercive force is usually within the range of from several millioersteds to several oersteds. When fine alloy particles of the above-described $Fe_{80}$-$B_{20}$ were formed on substrates by the process of this invention, films having good squareness ratios and high coercive forces (400-500 Oe) were however obtained. Similar results are available with not only Fe-B base alloys but also other amorphous ferromagnetic alloys. Accordingly, the present invention has such a significant merit that it provides useful recording media which have been rendered free of poor corrosion resistance and low uniformity developed due to amorphous structures and various other problems induced due to the existence of crystal grain boundaries.

The above-described perpendicular magnetic recording medium and its production process, both of which pertain to the present invention, have the following advantageous effects.

(1) Surface ruggedness can be avoided and particle orientation can be kept satisfactory because magnetic particles are not dispersed and oriented in a magnetic field but are caused to grow uniformly on a substrate.

(2) Upon causing particles to grow on a substrate, it is not absolutely necessary to raise the temperature of the substrate to apply a bias. Owing to this feature, not many limitations are imposed on the production conditions. Organic polymers having low softening points can also be utilized, leading to an expansion of the range of usable substrate materials.

(3) When formed into thin films by conventional techniques, their flexibility may be insufficient. The process of this invention can however provide flexible thin films, owing to the uniform isolation and distribution of magnetic particles coupled with the possibility of use of the above-described organic substrate materials.

(4) Unlike conventional processes relying upon magnetic anisotropy of crystals, the magnetic anisotropy of perpendicular magnetic recording media of this invention is primarily dependent on the shapes and sizes of particles formed on substrates. It is therefore possible to use a wide variety of ferromagnetic materials, whereby the anisotropy may be controlled with ease.

(5) The processes of this invention is unique also as a formation technique of fine particles. Formation of magnetic single domains provides a perpendicular magnetic recording medium with a high coercive force.

(6) Owing to the adoption of the vapor-phase growth technique, the process of this invention can provide perpendicular magnetic recording media having a wide range of alloy compositions the structures of which may range from crystalline ones to amorphous ones.

The invention will hereinafter be described specifically in the following Examples.

EXAMPLE 1

FIG. 1 is a scanning electron micrograph of fine columnar particles grown by gas plasma sputtering on a substrate, using pure Co as a deposited material and a nylon film as the substrate. From FIG. 1, it is readily envisaged that the fine particles obtained by the present process are uniformly distributed on the substrate. The B-H hysteresis loop of a film bearing the above-mentioned fine Co particles was measured by a vibration magnetometer. Measurement results are diagrammatically shown in FIG. 2, in which Curve 1 corresponds a magnetization curve in the direction perpendicular to the substrate and Curve 2 indicates a magnetization curve in the direction parallel to the substrate.

Figure 2:
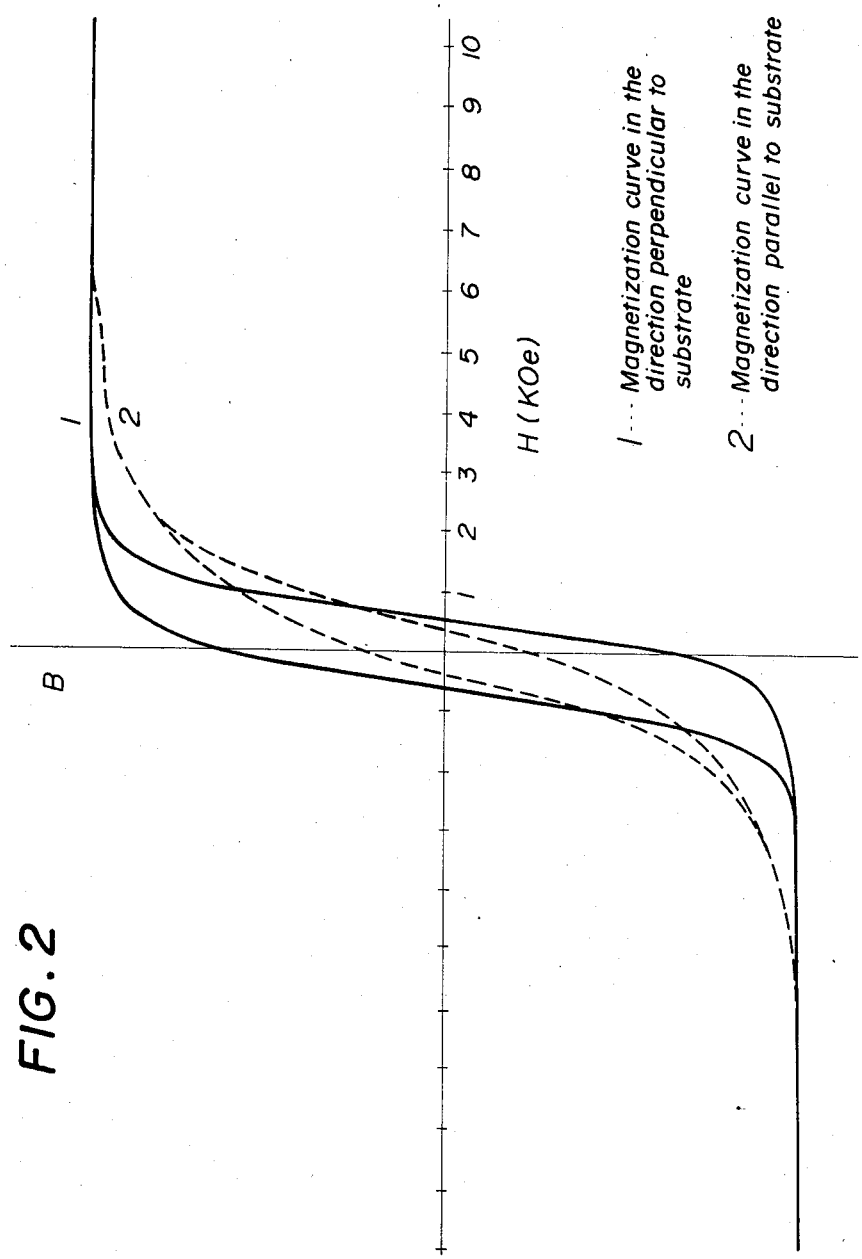
FIG. 2 is a B-H hysteresis loop of the magnetic recording medium depicted in FIG. 1.

Although FIG. 2 has not been corrected in view of the demagnetizing field, it is still envisaged that a good square loop is given in the magnetization curve in the direction perpendicular to the substrate.

EXAMPLE 2

Figure 3:
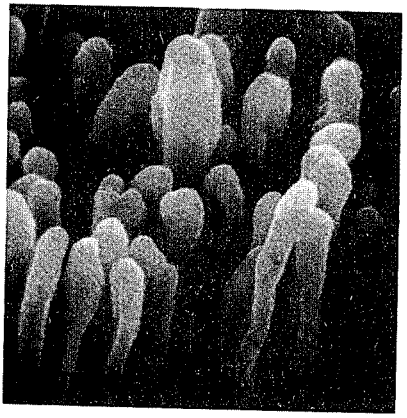
FIG. 3 is a scanning electron micrograph showing the morphlogy of particles on the surface of a perpendicular magnetic recording medium obtained in Example 2 of this invention.

A perpendicular recording medium was produced under the same conditions as those employed in Example 1, except that amorphous $Fe_{80}$-$B_{20}$ alloy was used as a deposited material. Its scanning electron micrograph and B-H hysteresis loop are shown in FIGS. 3 and 4, respectively.

In FIG. 4, Curve 3 corresponds a magnetization curve in the direction perpendicular to the substrate and Curve 4 indicates a magnetization curve in the direction parallel to the substrate.

EXAMPLES 3-10

Various perpendicular recording media were produced by changing the deposition process, substrate material and deposited material in various ways. Their production conditions and measurement results are summarized in Table 1.

als, it has simplified the production process, and it can use not only crystalline ferromagnetic materials but also amorphous ferromagnetic materials.

Having now fully described the invention, it will be apparent to one or ordinary skill in the art that many changes and modifications can be made thereto without departing from the spirit or scope of the present invention as set forth herein.

What is claimed is:

1. A perpendicular magnetic recording medium comprising:
    a substrate having $5 \times 10^5$-$5 \times 10^9$ fine projections per $mm^2$ formed on and projecting from the surface thereof, said projections having heights in the range of 0.01-10 μm and diameters in the range of 0.01-10 μm; and
    fine particles of a ferromagnetic material deposited onto each of the projections uniformly in a columnar structure, said columnar structure extending perpendicularly to said surface and being substantially isolated from each other with their axes of easy magnetization also extending perpendicularly to said surface.

2. A perpendicular magnetic recording medium as claimed in claim 1, wherein the substrate is a film or sheet made of one of cellulose, polyesters, polyfluorinated ethylene, polyethylene, polystyrene, polyvinyl chloride, polyimides, polyamides, epoxy resins and polyvinyl alcohol.

3. A process for producing a perpendicular magnetic recording medium, which comprises:
    effecting chemical etching, chemical deposition or gas plasma etching on the surface of a substrate to form fine projections, the heights and diameters of which are 0.01-10 μm and 0.01-1 μm respectively, on the surface at a density of $5 \times 10^5$-$5 \times 10^9$ projections per $mm^2$;
    causing fine particles of a ferromagnetic material to deposit on the substrate from a vapor phase in such a way that the fine particles are uniformly deposited on and adhered onto the fine projections in the form of columar structures that extend in a direction perpendicular to the substrate surface and are isolated from each other.

4. A process as claimed in claim 3, wherein the fine

TABLE 1

| Ex. No. | Deposition process | Deposited material | Substrate material | Aspect ratio of particles | Squareness ratio* | Coercive force(Oe) | Crystalline structure |
|---|---|---|---|---|---|---|---|
| 3 | plasma sputtering | Co | nylon | about 5:1 | 65 | 550 | crystalline |
| 4 | plasma sputtering | $Fe_{80}$—$B_{20}$ | nylon | about 5:1 | 70 | 420 | amorphous |
| 5 | plasma sputtering | Co | cellulose | about 4:1 | 60 | 480 | crystalline |
| 6 | plasma sputtering | $Fe_{80}$—$B_{20}$ | cellulose | about 4:1 | 65 | 250 | amorphous |
| 7 | plasma sputtering | Co | nylon | about 6:1 | 70 | 570 | crystalline |
| 8 | plasma sputtering | Co | nylon | about 3:1 | 40 | 200 | crystalline |
| 9 | vacuum deposition | Fe | polyimide | about 5:1 | 60 | 300 | crystalline |
| 10 | vacuum deposition | Co | polyimide | about 5:1 | 55 | 340 | crystalline |

*in the direction perpendicular to the substrate.

As has been described above, the present invention has brought about such remarkable effects that upon production of a perpendicular magnetic recording medium, it has expanded the ranges of selection of ferromagnetic materials to be deposited and substrate materiparticles of ferromagnetic material are deposited on the fine projections on the surface of the substrate by gas plasma sputtering, ionized cluster beam deposition, ion plating, vacuum deposition or ion beam sputtering.

5. A perpendicular magnetic recording medium, comprising:

a substrate having a flat surface, a multitude of integral fine projections densely formed on and extending from said surface, the number of said fine projections being from $5 \times 10^5$ to $5 \times 10^9$ fine projections per mm$^2$ of the area of said surface, said projections having heights in the range of 0.01 to 10 μm and diameters in the range of 0.01 to 1 μm, each of said fine projections having a layer of fine particles of ferromagnetic material uniformly deposited thereon and adhering thereto, said fine particles of ferromagnetic material deposited on each projection forming a columnar structure extending substantially perpendicularly to said surface, said columnar structures being substantially spaced and separate from each other, said fine particles of ferromagnetic material having their axes of easy magnetization aligned in a direction perpendicular to said surface and providing a multitide of magnetic single domains on said surface.

6. A process for producing a perpendicular magnetic recording medium, which comprises the steps of:

uniformly forming fine projections on the surface of a substrate by chemical etching, chemical deposition or gas plasma etching so that the number of said fine projections is from $5 \times 10^5$ to $5 \times 10^9$ fine projection per mm$^2$ of the area of said surface, said projections having heights in the range of 0.01 to 10 μm and diameters in the range of 0.01 to 1 μm, effecting gas plasma sputtering, ionized cluster beam deposition, ion plating vacuum deposition or ion beam sputtering to cause vapor phase deposition and adhesion of fine particles of ferromagnetic material uniformly on said fine projections to form a columnar structure of said fine particles on each of said projections with said columnar structures being spaced from each other and extending perpendicularly to said surface, said fine particles of ferromagnetic material having their axes of easy magnetization aligned in a direction perpendicularly to said surface and providing a multitude of magnetic single domains on said surface.

7. A process as claimed in claim 6, in which the substrate is a film or sheet made of one of cellulose, polyesters, polyfluorinated ethylene, polyethylene, polystyrene, polyvinyl chloride, polyimides, polyamides, epoxy resins and polyvinyl alcohol.

* * * * *

UNITED STATES PATENT AND TRADEMARK OFFICE
CERTIFICATE OF CORRECTION

PATENT NO. : 4 688 130
DATED : August 18, 1987
INVENTOR(S) : Yukio NAKANOUCHI et al It is certified that error appears in the above-identified patent and that said Letters Patent is hereby corrected as shown below:

Column 6, line 16; change "0.01-10 µm" to ---0.01-1 µm---.

Signed and Sealed this

Twenty-third Day of February, 1988

Attest:

DONALD J. QUIGG

*Attesting Officer*    *Commissioner of Patents and Trademarks*